Dec. 19, 1939.　　　M. S. JOHNSON　　　2,184,122
BRAKE HANGER SUSPENSION MEANS
Filed April 24, 1939　　　3 Sheets-Sheet 1
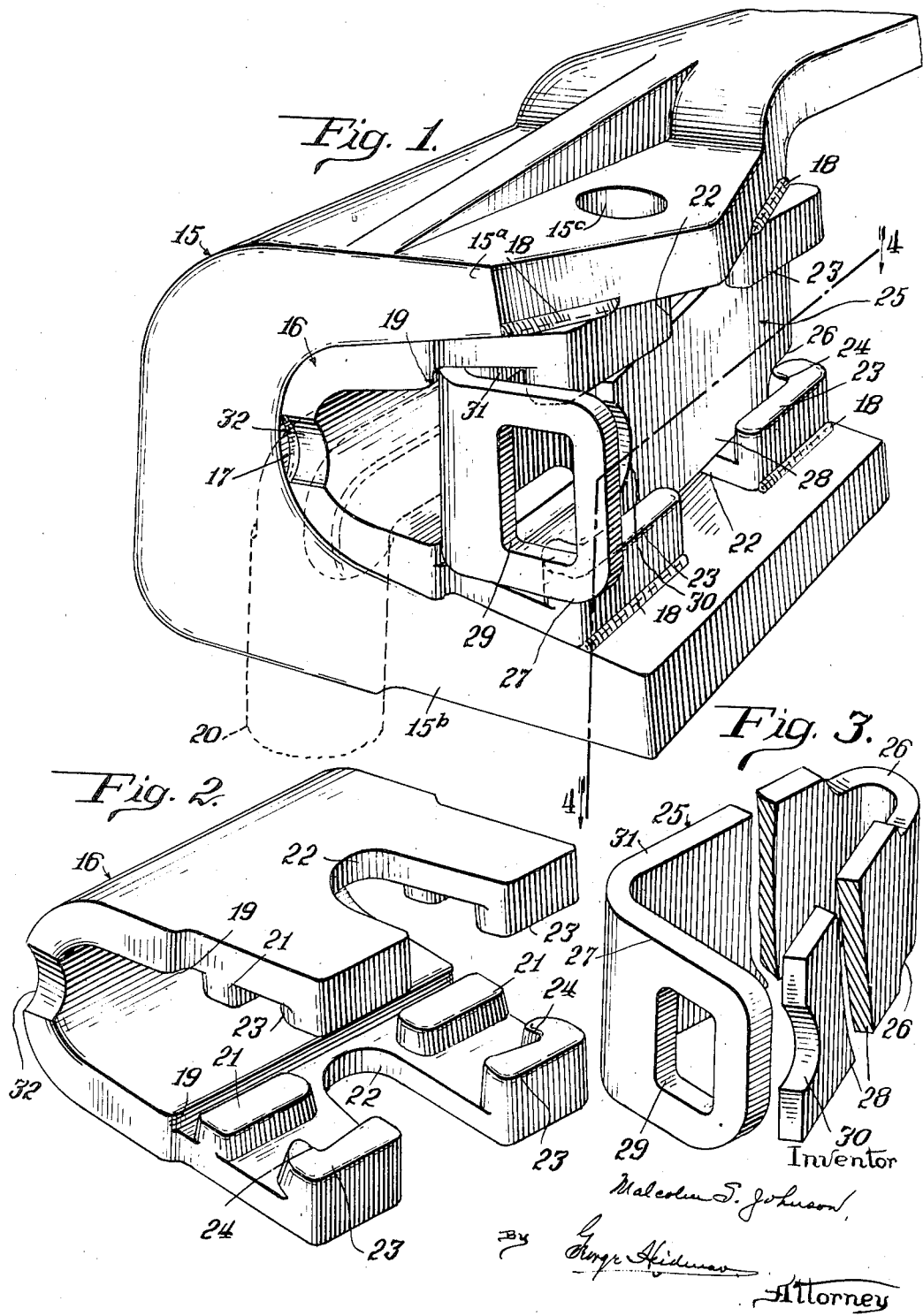

Dec. 19, 1939.  M. S. JOHNSON  2,184,122
BRAKE HANGER SUSPENSION MEANS
Filed April 24, 1939  3 Sheets-Sheet 2

Inventor
Malcolm S. Johnson
By George Heideman
Attorney

Dec. 19, 1939.  M. S. JOHNSON  2,184,122
BRAKE HANGER SUSPENSION MEANS
Filed April 24, 1939  3 Sheets-Sheet 3
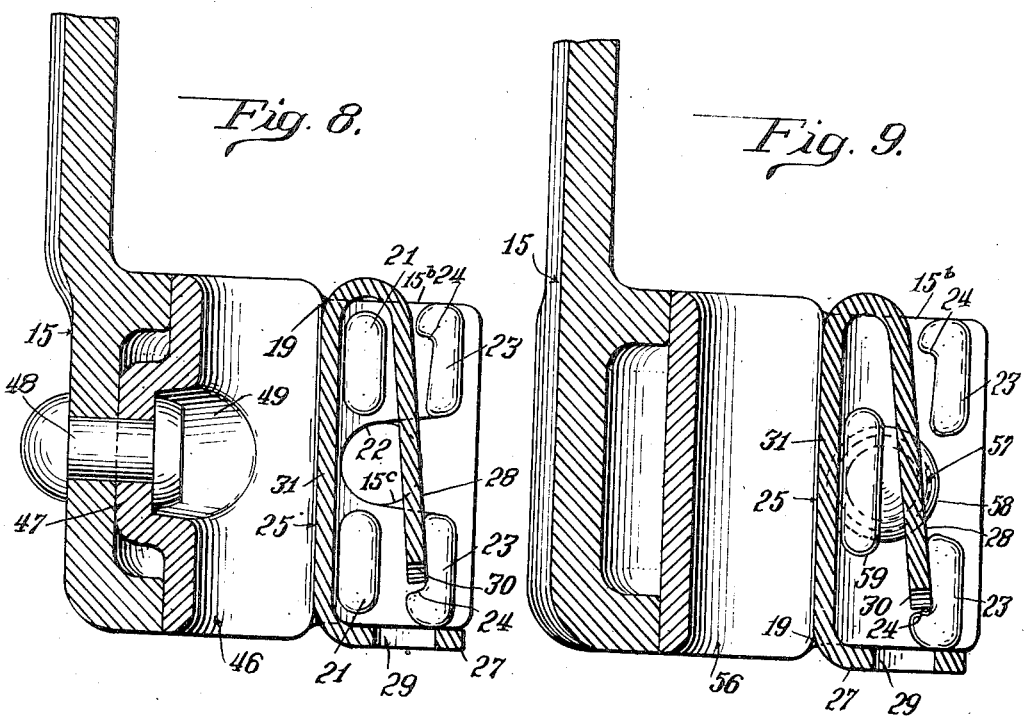
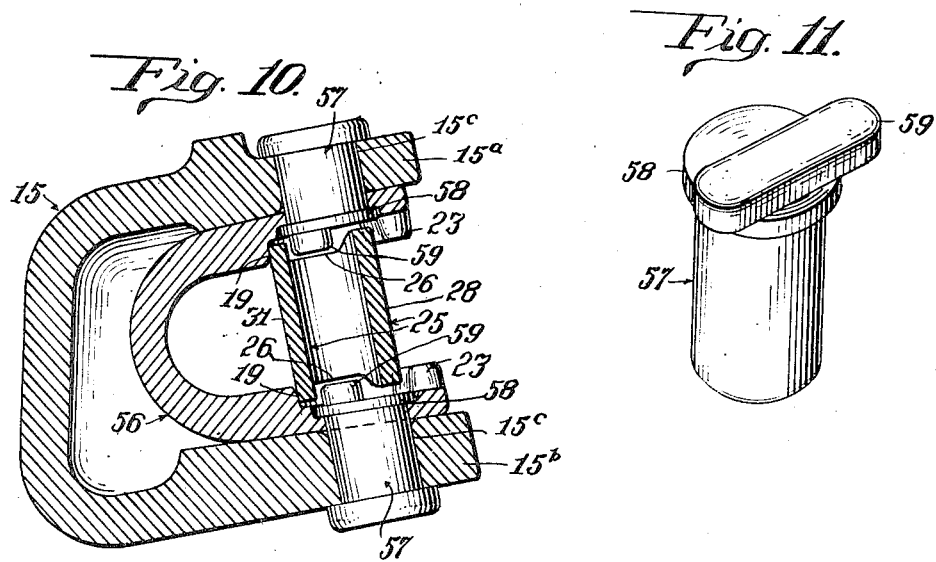
Inventor
Malcolm S. Johnson
By George Heideman
Attorney Patented Dec. 19, 1939

2,184,122

UNITED STATES PATENT OFFICE 2,184,122

BRAKE HANGER SUSPENSION MEANS

Malcolm S. Johnson, Chicago, Ill., assignor to Illinois Railway Equipment Company, Chicago, Ill., a corporation of Illinois Application April 24, 1939, Serial No. 269,573

18 Claims. (Cl. 188—209)

My invention relates to means whereby the brake hangers of railroad cars are pendently supported and retained in place in the sockets of the brackets which are generally formed integral with the truck side frames with the openings of the sockets in the ends of the bracket arms disposed toward the wheels of the truck.

My improved suspension means involves a wear element adapted to more or less conform to and to be seated in the socket of the bracket arm to relieve the bracket arm of wear which results from the vibratory or swinging movements of the hanger, namely an element which may be removed and replaced in the event of wear; and a retainer element whereby the hanger is retained in place. The wear element is formed to be reversible in the event of wear on the hanger supporting surface, but is adapted to be immovably mounted in the socket of the truck frame bracket; and the wear element and retainer are provided with correlated surfaces whereby the retainer element is automatically locked in place against accidental movement.

The invention has for its object the provision of hanger suspension means which will eliminate the use of the usual bolts or pins heretofore employed for fastening the wear elements in place and which in turn required means, such as nuts, for holding the bolts in place; the invention also obviating the necessity for exactness in fit between the wear element and the bracket arm.

The invention also has for its object the provision of means which permits removal to be made with greater ease and facility than is the case with the usual bolt and nut method of fastening the wear elements in place due to the fact that the nuts become rusted to the bolt and in a majority of cases necessitated burning off the bolts when the worn hanger or the wear plate were to be replaced.

The above enumerated objects and its advantages, as well as other advantages inherent in the invention, will all be more readily comprehended from the detailed description of the accompanying drawings in which—

Figure 1 is a perspective view of the outer or socket end of a bracket provided with one form of improved brake hanger suspension means.

Figure 2 is a perspective view of the wear element employed in the structure shown in Figure 1.

Figure 3 is a perspective view of my improved retainer element with intermediate portions broken away.

Figure 8 is a transverse sectional view, similar to Figure 6, illustrating a further modification of wear element.

Figure 9 is a similar view showing another modified form of wear element and its fastening means.

Figure 10 is a cross sectional view of the modification shown in Figure 9.

Figure 11 is a perspective view of one of the rivets or fastening members employed in the construction shown in Figures 9 and 10.

The various embodiments of my invention all involve wear elements, of substantially U-shape cross section, adapted to fit into the laterally disposed socket in the truck frame bracket shown at 15 in Figure 1 whereby the brake hanger link is supported in place; the elements being intended to relieve the bracket of wear which results from the vibratory movements of the hanger especially encountered during brake application or operation.

Figure 4:
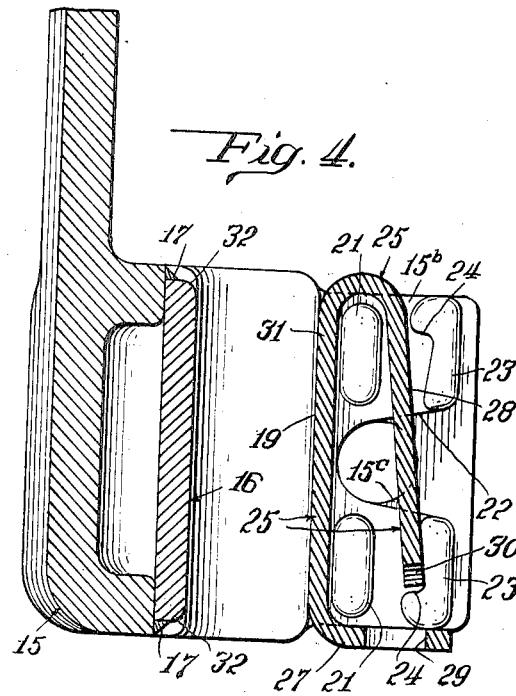
Figure 4 is a transverse sectional view of the construction shown in Figure 1 and taken substantially on the line 4—4 of Figure 1.

The particular exemplification of the invention, as disclosed in the first five figures of the drawings, comprises the wear element 16 which, as previously stated, is substantially U-shape in cross section formed of suitable metal and adapted to fit into the socket of the conventional truck bracket 15 between the upper jaw 15$^a$ and lower jaw 15$^b$, as shown in Figure 1; these jaws being shown provided with the usual bolt holes 15$^c$. The arcuate closed end of the wear element 16 is adapted to seat against the arcuate partial side walls at the inner end of the socket in the bracket and to which the wear element 16 is intended to be integrally secured, namely by tack welding as indicated at 17 and also preferably adjacent the forward ends of the element, as indicated at 18, 18. The two legs or sides of the wear element are identical in formation so as to make the element reversible and to facilitate application; and the inner surfaces of both legs or sides of the elements are shouldered at 19 at a distance forward of the closed arcuate end and therefore forward of the hanger receiving channel forming portion of the element, as indicated in Figure 1, where the upper end of a hanger or link is shown in dotted lines at 20. Both legs or sides of the wear element forward of the shoulders 19 are each provided with the aligned elongated lugs 21, 21 arranged in slight spaced relation with the shoulders 19 and on opposite sides of the cut-out portions or recesses 22 of the element; the recesses being adapted to register with the usual bolt holes 15c in the hanger bracket; the recesses 22 being preferably provided in the event an occasion should arise necessitating the use of the usual bolt. The forward ends of the two side walls or legs of wear element 16 are also provided with the transversely aligned elongated lugs 23 also arranged on opposite sides of the recesses 22. The lugs 23, adjacent the opposite sides of the wear element, have portions arranged substantially at right angles to the main portions of the lugs so as to provide the shoulders 24. The lugs 23, with their rearwardly turned ends, are disposed in spaced relation with the lugs 21, as shown in Figures 2 and 4.

As previously stated, the closed arcuate end of the wear element rearward of the shoulders 19, is adapted to receive the brake hanger or link while the forward ends of the wear element are intended to receive a retainer element 25, shown in Figure 3, and which is adapted to automatically effect locking engagement with the shouldered portions of certain of the lugs 23 and to effect bearing relation with the lugs 21 so as to transmit the hanger thrusts encountered by the retainer to the lugs of the wear element.

The retainer element 25 is intended to be formed of spring steel bent into somewhat U-shape with the closed or arcuate end reduced in vertical dimensions, as shown at 26 in Figure 3, to enable the retainer element to clear or pass over the lugs of the wear element during insertion.

The retainer element, at its open end, has the end of one of the sides bent substantially at right angles to the main portion, as shown at 27, namely toward the other side or leg 28 of the retainer element and the bent end 27 provided with a tool receiving opening 29 for purposes hereinafter explained. The leg or side 28 of the retainer element, intermediate of its longitudinal sides, is shown cut out or notched at 30, while the main portion of the end of leg 28 on opposite sides of the notch 30 is plane or disposed at right angles to the longitudinal sides and is intended to engage the shoulders 24 of the adjacent pair of lugs 23 on the upper and lower legs or sides of the wear element.

In view of the fact that the two sets of lugs 21 and 24 on both legs of the wear element 16 are of similar construction, it is apparent that the retainer element 25 may be inserted from either side of the bracket 15. In the exemplification the retainer element 25 is shown inserted through the outer side of the bracket 15.

The distance between the transverse shoulder 19 and the lugs 21 is just sufficient to receive the longitudinal edge of the long leg or side 31 of the retainer element 25; it being understood that the shoulders 19 of both sides or legs of the wear element 16 are in substantially the same vertical plane as are also both pairs of lugs 21, so that both the upper and lower longitudinal edges of the retainer element 25 will be arranged in the channels or grooves between the shoulders and lugs.

The closed or arcuate end of the retainer element is inserted through the side of the wear element 16 and for that reason this end is reduced vertically as shown at 26, both at top and at bottom to an extent slightly greater than the vertical dimensions of lugs 21 in order to enable the arcuate end of the retainer element to ride over lugs 21 during insertion and permit the arcuate closed end of the retainer to pass to the opposite end of the wear element as shown in Figure 4, while the short leg or side 28 of the retainer is disposed between the two sets of lugs 21 and 23.

The resilient retainer element 25 is made with the normal spread between the ends of the legs or sides 28 and 31 greater than the distance between the shoulders 19 and the inner main faces of lugs 23 and, of course, greater than the distance between the shoulders 19 and the ends of the angularly disposed ends of lugs 23.

By the reason of this fact, the retainer element 25 must be driven into place by hammer-blows delivered on the angularly disposed lobe or end 27 with sufficient force to cause the leg or side 28 of the retainer to flex toward the opposite leg or side 31 which is induced by the inturned ends of the adjacent top and bottom lugs 23; the leg or side 28 of the retainer riding between the lugs 21 and 23. As soon as the retainer 25 has been driven into wear element 16 sufficiently where the free end of leg or side 28 clears the inturned ends of top and bottom lugs 23, the side 28 of the retainer 25 springs back toward normal position causing the flat faces at the end of side or leg 28 to engage the shoulders 24 formed by the inturned ends of the adjacent top and bottom lugs 23 as shown in Figure 4, thereby firmly locking the retainer against withdrawal; further inward movement of the retainer toward the farther or opposite end of the wear element being prevented by the lobe or bent end of the leg or side 31 of the retainer as is clearly evident in Figures 1 and 4.

As is apparent from the construction, the retainer 25 constitutes one wall of the hanger channel in the wear element and all hanger thrusts encountered by the retainer element will be taken or transmitted to the lugs of the wear element which, by reason of its tack welded relation with the bracket, becomes, substantially, an integral part of the bracket. If it becomes necessary to renew the hanger link, this may be accomplished by inserting a suitable tool or bar through the opening 29 in the lobe or bent end 27 at an angle so the end of the bar may engage over the end of the leg or side 28 of the retainer which has been provided with the notch 30 to enable this to be readily accomplished and by using the outer side wall of the opening 29, namely the end of the lobe 27, as a fulcrum; the tool or bar being tilted about this fulcrum until the free end of leg or side 28 of the retainer has been sprung back sufficiently to clear the shoulders 24 of the adjacent lugs 23 at the top and bottom of the wear element, at which time the retainer may be driven out of the wear element 16.

In order to facilitate the welding of the wear element to the bracket, I prefer to notch the ends of the closed side or arcuate wall of the wear element 16 as shown at 32 in Figures 1 and 2 and thus enable a sufficient weld to be made and at the same time the weld 17 to be disposed within the plane of the bracket side walls without interfering with the channel or the freedom of the hanger link.

In the event it is decided to eliminate the bolt passage or recess 22 in the wear element, the lugs 21 on the same leg or side, as is apparent, may be made integral with each other to constitute a single elongated lug adapted to hold the inner side or leg 31 of the retainer element 25 against movement toward the forward end of the hanger socket and prevent undesirable chatter and wear producing vibration of the hanger.

Figure 6:
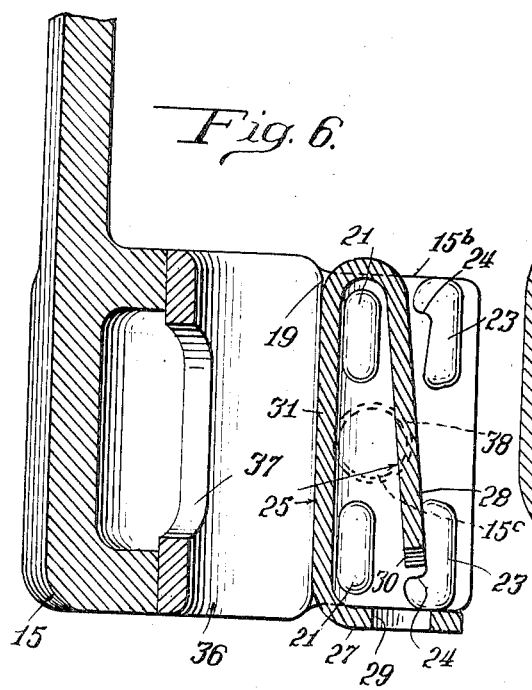
Figure 6 is a transverse sectional view, similar to Figure 4, illustrating a modified form of wear element.
Figure 7:
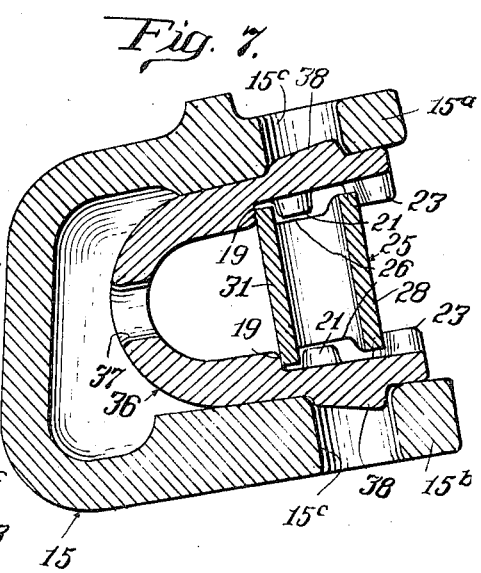
Figure 7 is a vertical sectional view, similar to Figure 5, of the form of means shown in Figure 6.

Figures 6 and 7 are sectional views illustrating the application of a modified form of wear element 36 whose general construction, in so far as lugs 21 and 23, is substantially similar to wear element 16 of Figure 2. Wear element 36 is of resilient metal and in order to provide the degree of resiliency desired is shown with a cut-out portion or opening 37 in the rear arcuate wall; the legs or sides of the element normally being spaced apart to an extent slightly greater than the distance between the top and bottom walls 15ª and 15ᵇ of the socketed bracket 15. The element 36 is formed with a similar shoulder 19 with the lugs 21 spaced from the shoulder 19 sufficiently to edgewisely receive the side 31 of the retainer element 25.

Wear element 36 is intended to be forced edgewisely through the forward end of the socket in the bracket and in order to lock the element in place, the outer faces of the top and bottom legs or sides of the element are provided with circular lugs 38, 38, preferably slightly tapered as shown and adapted to fit into the usual bolt receiving holes 15ᶜ formed in the upper and lower walls of the bracket socket.

The rear arcuate wall of the wear element 36 is inserted through the forward open end of the socket in the bracket and the element 36 forced inwardly until the lugs 38, 38 register with the holes 15ᶜ at which time the resiliency of the element 36 will cause its sides to spread apart and the lugs 38 to spring into the holes 15ᶜ and thereby lock the element against movement.

Figure 5:
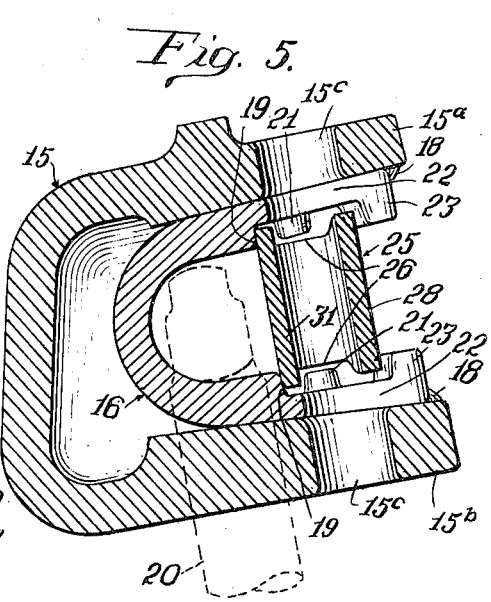
Figure 5 is a vertical sectional view of the construction shown in Figure 1.

After the wear element 36 has been put into place as described, the brake hanger or link 20 is then inserted, as shown in Figure 5, and the retainer 25 is then endwisely driven into place as heretofore described to a point where the free end of the side 28 will flex laterally into engagement with the main portion of the lug 23 and in line with the shouldered portion thereof, at which time the apertured end 27 of the retainer will be in engagement with the adjacent end of the wear element 36 and lengthwise movement of the retainer in either direction prevented.

Figure 8 is a sectional view illustrating one-half of another modified form of wear element 46. The major portion of element 46 is similar to wear element 16, being formed with the shoulder 19 and the two sets of lugs 21 and 23 formed on the inner surfaces of the top and bottom legs or sides of the reclining U-shaped element. Wear element 46 differs from the structure shown in Figure 1 in the method of securing it in the socket of the bracket 15. The closed arcuate wall of the wear element 46, intermediate of the opposite ends of the element, is outwardly offset as shown at 47 so as to extend into contact with the rear wall and between the partial side walls of the socket in the bracket 15 and offset portion 47 and the rear wall of the bracket both provided with registering holes adapted to receive the fastening member or rivet 48. The upper and lower legs or sides of the wear element adjacent the rivet receiving hole are slightly recessed or dished as shown at 49 to provide clearance for the head of the rivet which is located within the offset beyond the hanger receiving channel in the element 46; and the outer end of the rivet is upset or swaged as shown, thereby rigidly holding the wear element in place. After the hanger or link has been inserted into the rear or channel side of the element, a retainer element 25, similar to that shown in Figure 3, is then endwisely forced through one end of the wear element 46 until the free end of the retainer side 28 snaps into engagement with the adjacent lug 23, rearward of the shouldered end thereof, as heretofore described, thereby swingingly holding the brake hanger or link 20 in place and transmitting all hanger thrusts to the lugs and hence to the wear element which is rigidly secured to the bracket.

The sectional views, Figures 9 and 10, illustrate another form of wear element and method of securing same in the socket of the bracket 15; the same type of retainer element 25 being employed.

The general construction of the wear element 56 is similar to wear element 16 shown in Figure 2, except that the arcuate wall of the element 56 is not provided with the weld receiving notches 32 (because wear element 56 is intended to be secured in place by special rivets hereafter described) and is not provided with the two pairs of lugs 21 on the inner faces of the top and bottom legs or sides of the element; the top and bottom legs or sides, adjacent the outer ends, however, being provided with the shouldered lugs 23 as in the previously described structures; and the inner arcuate wall of the element is intended to fit against the arcuate partial side walls at the inner end of the socket in the bracket as shown in Figures 9 and 1.

Instead of the recesses 22 in the top and bottom legs or sides of the wear element—see Figure 2— the wear element 56 is preferably provided with holes arranged to register with the usual bolt-receiving holes 15ᶜ in the bracket top and bottom walls, see Figure 1, and adapted to receive the rivets 57, whose outer ends are upset or swaged as shown in Figure 10. The shanks of the rivets 57 are preferably cylindrical to match the round holes in the bracket and in the wear element, while the heads 58, toward one side of the center, are provided with the elongated enlargements 59 provided with flat longitudinal sides.

These rivets 57 are inserted through the inside of the wear element, with the enlargements 59 disposed transversely of the wear element as shown more clearly in Figure 9. The enlargements 59 are off-center as stated so that one longitudinal side will be disposed in close spaced relation and parallel with the respective shoulders 19 of the wear element; the spacing between the shoulders 19 and the enlargements 59 being sufficient to receive the longitudinal edges of the side 31 of the retainer element 25; the shoulders 19 and enlargements 59 holding the retainer against lateral movement in either direction and take up the hanger thrusts encountered by the retainer element. In order that the main portion of the heads 58 of the rivets may not extend into the path of the retainer 25, the rivet holes in the wear element at their inner ends are preferably countersunk; it being understood that the arcuate end of the retainer element is reduced transversely or cut away as indicated at 26 in Figure 3, which permits this closed end to pass over the enlargement 59 during its insertion endwisely through the open end of the wear element as heretofore described.

The wear elements are all symmetrical about their center lines so that the spring steel retainer elements (which are alike in all the suspension means shown) can be applied from either side of the bracket.

The various forms of the invention have been described in terms employed for purposes of description and not as terms of limitation, as structural modifications may be possible without, however, departing from the spirit of my invention as defined in the appended claims.

What I claim is:

1. Brake hanger suspension means comprising a wear element formed to support a bracket hanger or link and adapted to seat in the socket in the bracket of a truck side frame and to be secured thereto; and a retainer element adapted to be disposed transversely through the forward end of the wear element and effect locking engagement therewith and to transmit encountered hanger thrusts to the wear element.

2. Brake hanger suspension means comprising a wear element substantially of U-shape cross-section with the inner closed end adapted to provide a hanger or link receiving channel while the inner surfaces of the two legs or sides adjacent their outer ends are provided with spaced apart off-set surfaces; and a resilient retainer element of substantially U-shape cross-section adapted to be endwisely inserted into the wear element with its longitudinal edges disposed between the spaced apart off-set surfaces of the wear element so as to transmit encountered hanger thrusts through certain of the off-set surfaces to the wear element and to automatically effect locking engagement with the other off-set surfaces of the wear element.

3. Brake hanger suspension means comprising a substantially U-shape wear element adapted to fit into the laterally disposed socket of a brake hanger supporting bracket with its inner closed end adapted to receive a brake hanger or link, the inner surfaces of the top and lower sides or legs of the element forward of the hanger receiving portion being provided with elongated lugs disposed transversely of the element; and a resilient retainer element bent into substantially U-shape with the end of one of its sides or legs bent toward the other side or leg of said element, said element being endwisely inserted through an open side of the wear element and one of its sides in bearing relation with certain of said elongated lugs while the end of the other side effects locking engagement with the other lugs.

4. Brake hanger suspension means comprising a substantially U-shape wear element formed at its closed end to receive a brake hanger or link while the inner faces of the upper and lower sides are provided with correlated shoulders and elongated lugs disposed transversely of the element and spaced apart; and a substantially U-shape retainer element endwisely insertible into said wear element with its longitudinal edges arranged in abutting relation with said shoulders and certain of the lugs and with one of its free ends effecting locking relation with the other lugs of the wear element.

5. Brake hanger suspension means comprising a substantially U-shape brake hanger receiving element provided with off-set surfaces on its inner face; and a resilient retainer element adapted to be endwisely inserted into the hanger receiving element and to effect interlocking engagement with said off-set surfaces.

6. Brake hanger suspension means comprising a substantially U-shape brake hanger receiving element provided with spaced apart off-set surfaces on its inner surface; and a resilient retainer element bent into substantially U-shape and adapted to be endwisely inserted into the receiving element with the longitudinal edges of one of its sides arranged in bearing relation with certain of the off-set surfaces of the receiving element while the other side of said retainer element effects locking engagement with other off-set surfaces of the receiving element.

7. Brake hanger suspension means comprising a substantially U-shape brake hanger receiving element provided with abutment forming surfaces on its inner surface arranged in spaced relation between the hanger receiving end and the outer end; and a resilient retainer element bent into substantially U-shape and adapted to be endwisely inserted into the receiving element with the longitudinal edges of one of its sides arranged between certain of said abutment forming surfaces and the end of said side bent laterally in overlapping relation with the side of said hanger receiving element, while the end of the other side of said retainer element is adapted to effect locking engagement with the other abutment forming surfaces.

8. Brake hanger suspension means comprising a reversible wear element of substantially U-shape cross-section provided with an arcuate rear wall and with similar shoulders and lugs on the inner faces of both legs or side portions, the lugs being provided with shoulder forming portions; and a resilient U-shaped retainer element adapted to be endwisely inserted into the wear element with the longitudinal edges of one leg of the retainer element bearing against the shoulders while the free end of the other leg of said retainer element is adapted to engage said shoulder forming portions to prevent withdrawal and the free end of the first mentioned leg formed to control the degree of movement of the retainer element in the opposite direction.

9. Brake hanger suspension means comprising a resilient wear element of substantially U-shape cross-section provided on the outer faces of its two sides or legs with enlargements adapted to fit into the bolt receiving holes in the socketed bracket of a truck side frame, while the inner faces of the sides or legs are each provided with off-set surfaces disposed transversely and in spaced rows; and a retainer element of substantially U-shape cross-section adapted to edgewisely fit into the wear element with the longitudinal edges of one leg of the retainer element in abutting relation with certain of the off-set surfaces of the wear element while the end of the other leg of the retainer element is in locking relation with the other off-set surfaces of the wear element.

10. Brake hanger suspension means of the character described comprising a resilient and reversible wear element of substantially U-shape cross-section provided on its outer side faces with projections adapted to effect locking engagement with the socketed bracket of a truck side frame, the inner faces being provided with shoulders and lugs arranged transversely of the element and in spaced apart rows, with certain of the lugs having off-set shoulders; and a retainer element of resilient metal and of substantially U-shape cross-section adapted to be inserted through one end of the wear element with the longitudinal edges of one leg of the retainer element disposed between the shoulders and the adjacent rows of lugs of the wear element while the end of the other leg of the retainer element automatically effects locking engagement with the off-set shoulders of the other row of lugs in the wear element.

11. A brake hanger suspension means comprising a reversible wear element of substantially U-shape cross-section provided with off-set surfaces on the inner faces of its two legs or sides; and a resilient retainer element of substantially U-shape cross-section adapted to be inserted through an end of the wear element in engagement with the off-set surfaces so as to transmit the hanger thrusts encountered by the retainer element to the off-set surfaces of the wear element, one end of the retainer element being adapted to effect locking engagement with certain of the off-set surfaces of the wear element to prevent movement in one direction, while the other end of said retainer element is adapted to prevent movement of the retainer element beyond a predetermined extent in the opposite direction.

12. Brake hanger suspension means comprising a reversible wear element of substantially U-shape cross-section, the inner faces of its two legs or sides being formed with shoulders and with shouldered lugs adjacent the ends of the legs or sides and rivet receiving holes intermediate of said shoulders and said lugs; rivets provided with elongated heads adapted to be inserted through said holes with the heads located in the wear element; and a resilient retainer element of substantially U-shape cross-section adapted to be edgewisely inserted through an end of the wear element with one leg or side of the retainer element bearing against the elongated heads of the rivets while the end of the other leg or side of the retainer element automatically effects locking engagement with the shouldered lugs of the wear element.

13. Brake hanger suspension means comprising a wear element adapted to fit into the socket of a truck side frame hanger bracket and to support a brake hanger; and a retainer element adapted to be inserted in the forward end of the wear element and effect locking engagement therewith, said retainer element being substantially coextensive with the width of the wear element and constituting a closure for the forward end of the wear element.

14. Brake hanger suspension means comprising a U-shaped wear element adapted for insertion in the socket of the brake hanger bracket on a truck frame to support a hanger, the inner face of the element having spaced apart off-set surfaces; and a retainer element, substantially coextensive with the width of the wear element adapted to be inserted in the forward end of the wear element to constitute a closure therefor and to effect interengaging relation therewith whereby the retainer is locked in place.

15. Brake hanger suspension means comprising, in combination with the hanger bracket of a truck frame provided with a socket whose top and bottom walls have aligned openings, a U-shaped wear element adapted to fit into the socket of the hanger bracket and having holes adapted to register with the openings in the bracket, said element on its inner face being provided with spaced apart offset surfaces; means insertible through the registering openings and holes of the bracket and wear element for securing the latter in place, said means at their inner ends being formed to provide bearing surfaces disposed intermediate of the spaced apart off-set surfaces of the wear element; and a resilient retainer element adapted to be inserted between certain of the off-set surfaces of the wear element and the bearing surfaces of said means and to effect locking engagement with the other off-set surfaces of the wear element.

16. Brake hanger suspension means comprising a wear element adapted to be inserted in the socket of a brake hanger bracket on a truck frame and provided with off-set surfaces; and a retainer element adapted to extend transversely through the wear element intermediate of the off-set surfaces to constitute a closure for the wear element and to effect interlocking engagement with said off-set surfaces.

17. Brake hanger suspension means comprising, in combination with the hanger bracket of a truck frame provided with a socket whose top and bottom walls have openings, a resilient U-shaped wear element adapted to fit into the socket of the hanger bracket and provided with lugs on its outer face adapted to fit into the openings of the socket walls of the bracket to lock the wear element in place, the inner face of the wear element having spaced apart off-set surfaces forward of the hanger receiving end of the element; and a resilient substantially U-shaped retainer element adapted to be inserted between the off-set surfaces of the wear element and effect interengaging relation therewith.

18. Brake hanger suspension means comprising a wear element adapted to swingingly support a brake hanger and provided with off-set surfaces; and a retainer element adapted to effect interengaging relation with said off-set surfaces to lock said elements together and to constitute a closure for the forward end of the wear element.

MALCOLM S. JOHNSON.